March 10, 1942.　　M. E. MARTELLOTTI　　2,275,783
OVERARM STRUCTURE
Filed June 28, 1940　　3 Sheets-Sheet 1
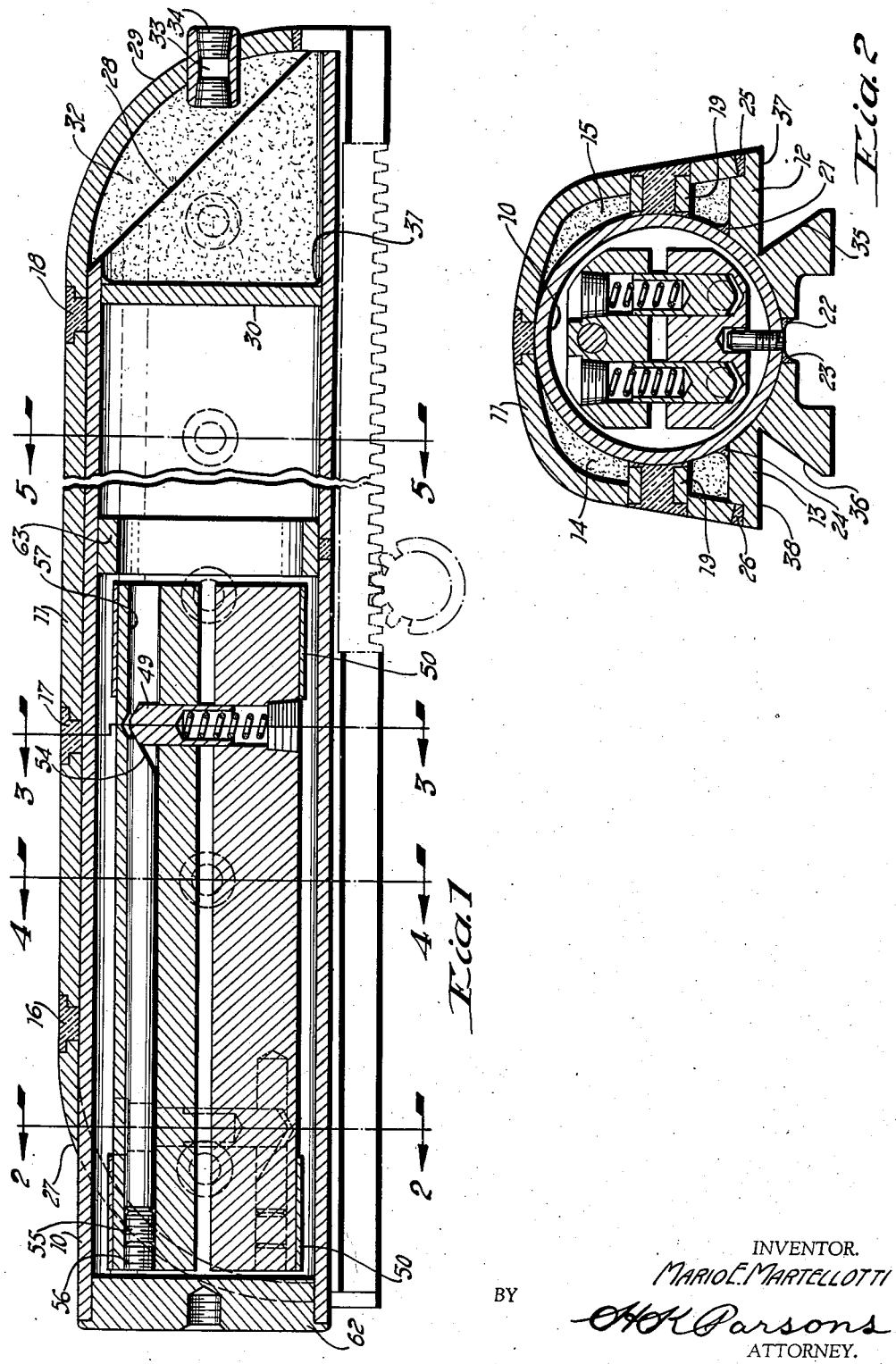
INVENTOR.
MARIO E. MARTELLOTTI
BY
HK Parsons
ATTORNEY.

March 10, 1942.  M. E. MARTELLOTTI  2,275,783
OVERARM STRUCTURE
Filed June 28, 1940   3 Sheets-Sheet 2
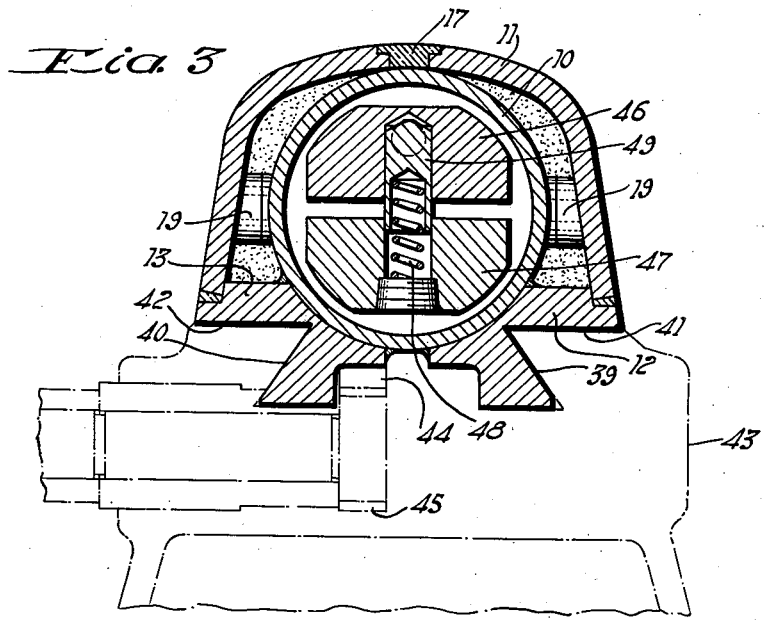
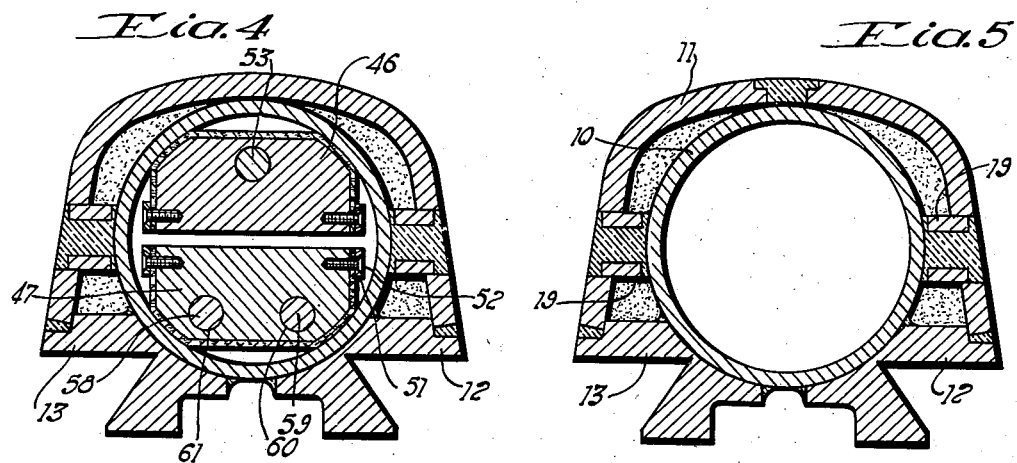
INVENTOR.
MARIO E. MARTELLOTTI
BY
A. H. Parsons
ATTORNEY.

March 10, 1942.   M. E. MARTELLOTTI   2,275,783
OVERARM STRUCTURE
Filed June 28, 1940   3 Sheets-Sheet 3
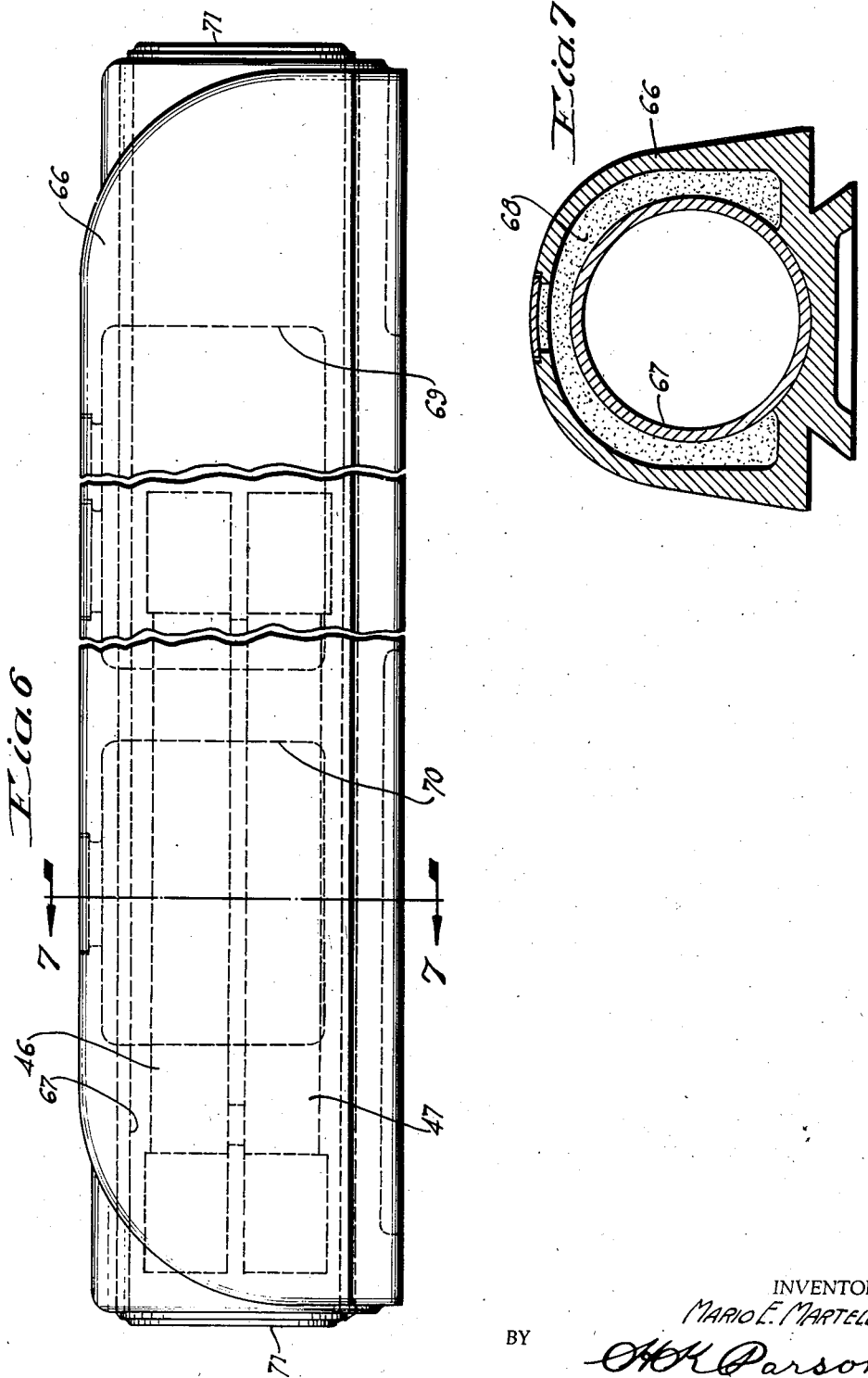
INVENTOR.
MARIO E. MARTELLOTTI
BY
AHK Parsons
ATTORNEY.

Patented Mar. 10, 1942

2,275,783

UNITED STATES PATENT OFFICE 2,275,783

OVERARM STRUCTURE

Mario E. Martellotti, Cincinnati, Ohio, assignor to The Cincinnati Milling Machine Co., Cincinnati, Ohio, a corporation of Ohio Application June 28, 1940, Serial No. 343,019

12 Claims. (Cl. 90—20.5)

This invention relates to machine tools and more particularly to a vibration damped overarm suitable for milling machines and the like.

Certain types of machine tools, of which a milling machine is an example, utilize rotary toothed cutters for removing stock which are driven by a cutter spindle which is usually fixed axially. It is often necessary, however, that the cutter be remotely positioned with respect to the spindle in order to reach a prescribed portion of a work piece. In such cases, the cutter is supported on an extension of the spindle in the form of a cutter arbor. It is necessary, therefore, to provide means for supporting the arbor and thereby the cutter against any lateral movement during the machining operation.

One form of such means is an overarm with suitable pendants, which, when in position, has one portion of its length rigidly attached or secured to the support for the spindle which may be the main body of the machine, while the remaining length projects unsupported parallel to the cutter arbor. The overarm should be sufficiently rigid to prevent lateral movement of the arbor and cutter during a machining operation. Such an overarm, however, has a natural period of vibration while the rotating cutter contacting the work creates periodic vibrations, the number of which will vary in accordance with the number of teeth in the cutter and its speed of rotation.

If these periodic impulses contain harmonics of appreciable amplitude which correspond in frequency to the natural frequency of the overarm, a self-sustaining circle of effects is produced which increases the amplitude of vibration of the overarm. This produces an undesirable chattering condition.

One of the objects of this invention is to provide an overarm which is so fabricated that it inherently opposes vibration.

Another object of this invention is to provide an overarm structure which may be readily utilized under varying operating conditions for supporting a cutter arbor without noticeable or appreciable vibration.

A further object of this invention is to provide an improved fabricated overarm having built-in dampening means and a tuned opposer for opposing vibration thereof.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a sectional elevation of an overarm illustrating one embodiment of this invention.

Figure 2 is a section on the line 2—2 of Figure 1.

Figure 3 is a section on the line 3—3 of Figure 1.

Figure 4 is a section on the line 4—4 of Figure 1.

Figure 5 is a section on the line 5—5 of Figure 1.

Figure 6 is a side elevation of a modified form of the invention.

Figure 7 is a section on the line 7—7 of Figure 6.

In general, this invention contemplates an overarm structure for supporting cutter arbors in such manner that the natural periodic vibrations created by the intermittent engagement of a toothed cutter with a work piece will be absorbed as fast as they are produced, thereby preventing harmonic effects which tend to increase the amplitude of vibration and cause chattering.

This invention aims to produce a fabricated overarm structure which has, in general, a central structural member which may be in the form of a tube extending approximately the full length of the overarm, and of surrounding this member with a suitable shroud which is supported by the central member but in suitable spaced relation thereto to form a series of closed chambers. These chambers are filled with a non-resilient or non-vibrating mass, such as sand, which acts as a dampening means to absorb vibration from the surrounding walls as well as eliminate noises which usually emanate from hollow structures.

In addition, there is provided in one end of the overarm a tuned opposer which may be adjusted to absorb more directly the vibrational impulses created by engagement of the cutter with the work, the opposer being located in that end of the overarm which is unsupported and directly over the cutter.

Referring more specifically to the drawings one embodiment of the invention is disclosed in Figures 1 to 5 inclusive. It will be noted from these figures that the overarm has a central structural member in the form of a tube 10 which extends throughout the length of the overarm.

Although other cross sectional shapes could have been chosen, the tubular form has been selected because it has greater rigidity against deflection in all directions.

The tubular member is enclosed in a shroud comprising a cover plate 11, and guide rails 12 and 13. The cover plate 11 is formed in the shape of an inverted trough so that when placed in position it affords spaces 14 and 15 between each side of the tubular member and the cover plate. The cover plate is tangent to the top of the tube and is welded to it along the line of tangency at several points, such as 16, 17 and 18 as shown in Figure 1. Additionally, a series of spacers 19, Figure 2, are welded in position between the opposite sides of the tube and the cover plate 11 to support the cover plate in predetermined spaced relation to the wall of the tube and to add rigidity to the structure. The guide rails 12 and 13 are welded longitudinally to the underside of the tube along corners 21, 22, 23 and 24. The guide rails also interlock with the lower edges of the cover plate and are welded longitudinally at 25 and 26. The tube 10 projects through the forward end of the cover plate 11, as shown in Figure 1, and a tight fit is made between the wall of the tube and the dished wall 27 of the cover plate.

The rear end of the tube is cut off at an angle of substantially 45 degrees as indicated at 28 so that the rear end of the tube is totally enclosed by the dished end 29 of the cover plate 11. A partition plate 30 is welded at 31 in the end of the tube. It should now be evident that the side spaces 14 and 15 communicate with the space 32 between the end of the tube and the end 29 of the cover plate. The side spaces and the end space thus created are filled with a non-resilient material such as sand through an opening 33 which is afterwards sealed by a plug 34. This material constitutes a dampening means for assisting in preventing vibration of the overarm structure, and incidentally in deadening the sound which would otherwise be created in a hollow structure.

The guide rails 12 and 13 have dovetail guide surfaces 35 and 36, and supporting surfaces 37 and 38 which are adapted to interfit with similar formed surfaces 39, 40, 41 and 42 formed on the top of a column 43 of a knee and column type milling machine, as shown in Figure 3. It is the general practice to make overarm structures so that they may be adjusted which is the reason for mounting them in guideways, and since they are of considerable weight, mechanical means are utilized for effecting this adjustment which may be in the form of a rack and pinion. Therefore, a rack 44 is secured to the underside of one of the rail members, such as the member 13. This rack is engaged by a suitably positioned pinion 45 mounted in the supporting structure.

In the normal operating position of the overarm, approximately one-half of its length is supported and the remaining portion unsupported. Pendants, not shown, are mounted on the unsupported length of the overarm guideway for journaling the unsupported lengths of a cutter arbor. It will be noted from this that any lateral vibration caused by cutter engagement with the work will be directly transmitted through the pendants to the unsupported length of the overarm whereby this portion of the overarm receives directly the vibratory impulses developed by the cutter and is therefore more subject to vibration than the rear portion of the overarm which is attached to the machine. For this reason a tuned opposer for eliminating vibration is mounted in the forward portion of the overarm and is actually mounted within the tubular member.

The tuned opposer comprises two longitudinally extending inertia members 46 and 47 which are held separated by a series of springs 48, one end of the springs fitting in thimble plungers 49. As shown in Figure 4, the ends of the inertia members are wrapped with a strip of dampening material 50 which is of sufficient thickness that only the ends of the inertia members make contact with the inner wall of the tubular member and then at four circumferentially spaced points. The strips of material 50 are fastened to the inertia members by clamping strips 51 and fastening screws 52. This material may be sheet cork.

Since the majority of the vibratory impulses imparted to the overarm will be laterally thereof, the inertia members are located one over the other so that when a lateral force component created by the cutting force acts on the overarm, tending to shift the inertia members, the force will be absorbed by compression of the springs. The area of contact between the inertia members and the tube is at an angle of substantially 45 degrees to the direction of the force component which thereby tends to move the inertia members toward one another which movement is opposed by the springs. It is, therefore, necessary that the springs be so adjusted that this relative movement can take place to a certain degree because otherwise if the springs were made too rigid the inertia members would move as a unit with the tubular members and the value of the tuned opposer would be lost. Adjustment of the spring values is obtained by pointing the ends of the plungers and providing bevel-ended adjusting rods which determine the initial compression of the springs.

The spring 48 shown in Figure 3 and located near one end of the inertia members is adjusted by the rod 53 shown in Figure 1 and having a bevel end 54 for engaging the pointed end of plunger 49. An adjustment screw 55 and a locking screw 56 are threaded in the end of the bore 57 in which the rod slides. The springs 48 shown in Figure 2 and located near the opposite end of the inertia members are adjusted by similar bevel-ended rods 58 and 59 which are shown in Figure 4 and slidably mounted in bores 60 and 61 formed in the inertia member 47. The ends of these bores are provided with adjusting and locking screws in a similar manner to that shown in Figure 1.

The extent of axial movement of the inertia members is confined to small limits by a plug 62 inserted in the end of the tube and a ring 63 welded to the interior wall of the tube near the opposite end of the inertia members. In order to prevent the inertia members from working rotatively out of position a set screw 64 is threaded in the bottom of the tube as shown in Figure 2 and freely engaging a hole 65 formed in the bottom of the inertia member 47.

In Figure 6 there is shown a modified form of the invention in which the shroud 66 surrounding the tubular member 67 is cast integral with the tube. The advantage of this construction is that the core sand 68 utilized to provide the closed chambers 69 and 70 during casting is left in position after casting so that the chambers do not have to be filled later. Otherwise, the general features of the invention are the same, the tuned opposer being mounted in one end of the tube, and the ends of the tube are closed by plates 71 inserted in the ends of the tube and welded or otherwise secured in place.

There has thus been provided an improved overarm for milling machines and the like which is especially useful for opposing and subduing vibration caused by toothed cutters.

What is claimed is:

1. In an overarm structure for milling machines and the like, the combination of an elongated tubular member, a shroud integrally attached tangentially to the top of said member and enveloping said member to form separate chambers on opposite sides thereof, guideways formed longitudinally of the overarm for adjustable mounting on a machine and a non-resilient material packed in said chambers to dampen vibration of the overarm.

2. In an overarm for milling machines and the like, the combination of an elongated tubular member, means surrounding the member and spaced therefrom to form lateral chambers, guideway members integrally attached to the tubular member and extending longitudinally thereof for guiding the overarm on a machine, and a tuned opposer mounted within one end of the tubular member for reducing vibration of the overarm, said overarm being adapted to be mounted on the machine with the tuned opposer in the unsupported or outboard end of the overarm.

3. An overarm for milling machines and the like comprising an elongated member, dovetailed guideways formed longitudinally of the member by which the overarm may be adjustably mounted in a machine, an inner cylindrical wall extending centrally through the member, an exterior wall attached to the top of the inner wall along a line of tangency but depending therefrom to form lateral spaces on opposite sides of the overarm and a non-resilient material packed in said spaces to reduce vibration of the overarm.

4. An overarm for milling machines and the like comprising an elongated body, dovetailed guideways formed longitudinally of the body, said body having a central cylindrical bore, and means mounted in one end of said bore for dampening vibration of the overarm including a pair of inertia members, resilient means interposed between said members for holding them in engagement with the wall of said bore whereby a lateral disturbing force will be absorbed by compression of said resilient means.

5. An overarm for milling machines and the like comprising an elongated member, a central bore formed in said member and means mounted in one end of said bore for preventing vibration of the overarm including a pair of inertia members, guideways formed longitudinally of the overarm by which it may be adjustably positioned on a machine, means for mounting said inertia members so that they will lie in a superimposed relation along a line perpendicular to the plane of said guideways, and resilient means for holding said members separated and in frictional engagement with the wall of said tube whereby lateral movement of the overarm will be absorbed by compression of the resilient means.

6. An overarm structure for milling machines and the like comprising a cylindrical member, an exterior wall tangent to one side of the member and partially circumscribing the same, said wall being attached to said member along the line of tangency, means attached to the side of the member opposite to the line of tangency for supporting the ends of the exterior wall in spaced relation to the member, thereby forming lateral spaces on opposite sides of the member, said spaces being filled with a vibration dampening medium, means closing the end of said spaces and said cylindrical member, and guideways formed on the underside of said member and extending longitudinally thereof.

7. An overarm structure for milling machines and the like comprising a cylindrical member, an exterior will tangent to one side of the member and partially circumscribing the same, said wall being attached to said member along the line of tangency, means attached to the side of the member opposite to the line of tangency for supporting the ends of the exterior wall in spaced relation to the member, thereby forming lateral spaces on opposite sides of the member, said spaces being filled with a vibration dampening medium, means closing the end of said spaces and said cylindrical member, guideways formed on the underside of said member and extending longitudinally thereof, and a tuned opposer mounted within the cylindrical member for opposing vibration of the overarm.

8. An overarm structure for a milling machine comprising a cylindrical member, an exterior wall tangent to one side of the member and partially circumscribing the same, said wall comprising a formed plate welded to the member along the line of tangency, means attached to the side of the member opposite to the line of tangency and including a pair of guide rails welded longitudinally of the tubular member and to the ends of said plate in a manner to support said plate in spaced relation to the member, thereby forming lateral chambers, means closing the ends of said chambers and said tubular member, and vibration dampening means packed in said chambers.

9. An overarm structure for a milling machine comprising a cylindrical member, an exterior wall tangent to one side of the member and partially circumscribing the same, said wall comprising a formed plate welded to the member along the line of tangency, means attached to the side of the member opposite to the line of tangency and including a pair of guide rails welded longitudinally of the tubular member and to the ends of said plate in a manner to support said plate in spaced relation to the member, thereby forming lateral chambers, means closing the ends of said chambers and said tubular member, vibration dampening means packed in said chambers, and a tuned opposer mounted in the cylindrical member for opposing vibration of the overarm.

10. An overarm structure for milling machines and the like comprising a cylindrical member, an exterior wall tangent to one side of the member and partially circumscribing the same, means attached to the opposite side of the member and extending laterally for engaging the ends of the exterior wall for supporting the same in spaced relation to said member to form lateral chambers extending longitudinally of the overarm, said exterior wall and said means being integrally cast about said cylindrical member, means closing the ends of said chambers and said tube, and sand packed in said lateral chambers for dampening vibration of the overarm.

11. An overarm structure for milling machines and the like comprising a cylindrical member, an exterior wall tangent to one side of the member and partially circumscribing the same, means attached to the opposite side of the member and extending laterally for engaging the ends of the exterior wall for supporting the same in spaced relation to said member to form lateral chambers extending longitudinally of the overarm, said exterior wall and said means being integrally cast about said cylindrical member, means closing the ends of said chambers and said tube, and sand packed in said lateral chambers for dampening vibration of the overarm, and a tuned opposer mounted within the cylindrical member for opposing vibration of the overarm.

12. A fabricated overarm for milling machines and the like comprising a pair of longitudinal rail members laterally spaced to fit supporting guideways of a machine tool, a formed housing plate attached longitudinally to the rail members, means dividing the interior of the housing into a central tubular chamber extending longitudinally of the overarm and other chambers separated therefrom, non-resilient material filling said other chambers to form vibration dampening means, and a tuned oposer mounted in one end of the tubular chamber comprising a pair of superimposed inertia members, resilient means interposed between said members to hold them apart and in contact with the wall of said chamber whereby any lateral force acting on the overarm tending to cause vibration will be absorbed by compression of the resilient means by said inertia members, means to adjust the tension of said resilient means, and means to prevent longitudinal shifting of said inertia members relative to the overarm.

MARIO E. MARTELLOTTI.